March 21, 1950     D. KELLEHER     2,501,057
WEAR TAKE-UP MEANS FOR FRICTION CLUTCHES
Filed June 11, 1945
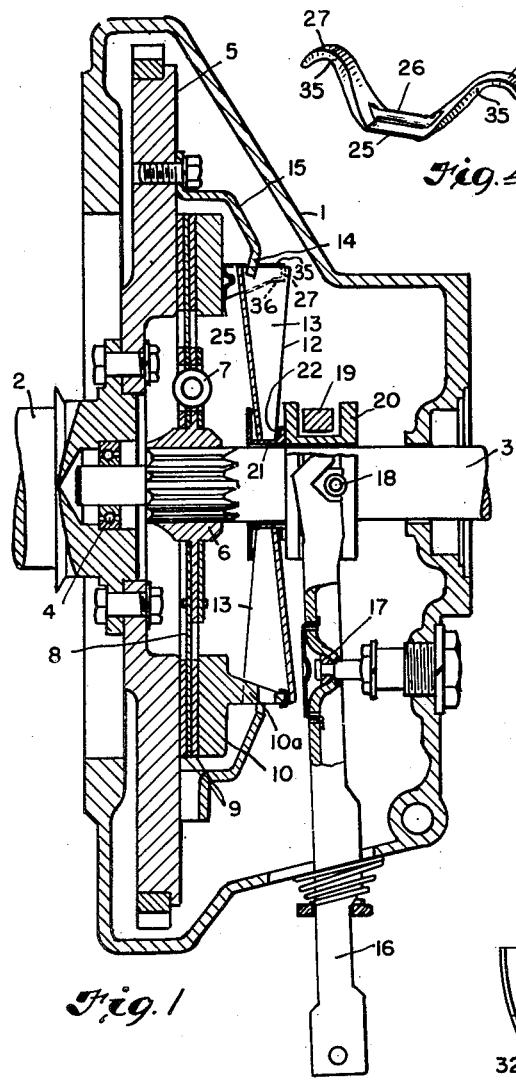
Fig. 1
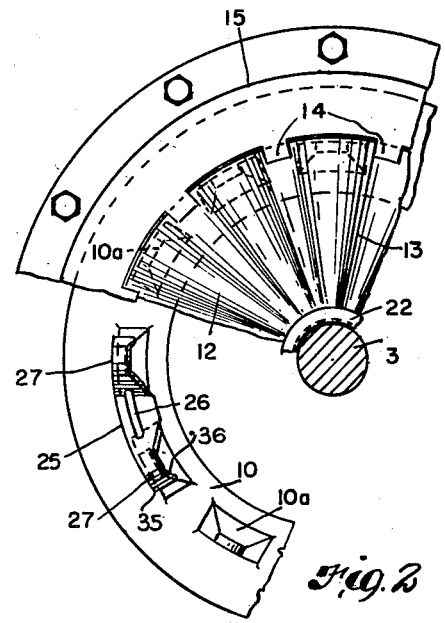
Fig. 2
Fig. 4
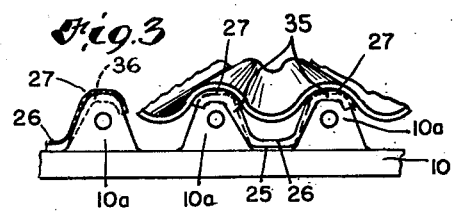
Fig. 3
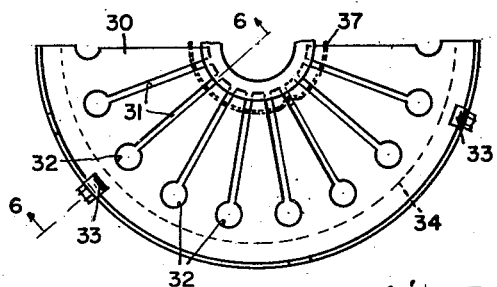
Fig. 5
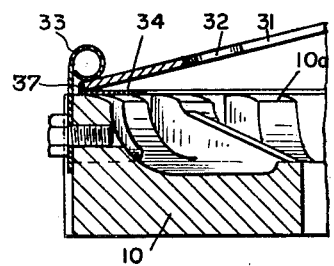
Fig. 6
*INVENTOR.*
DANIEL KELLEHER
BY
Oberlin & Limbach
ATTORNEYS Patented Mar. 21, 1950

2,501,057

UNITED STATES PATENT OFFICE 2,501,057

WEAR TAKE-UP MEANS FOR FRICTION CLUTCHES

Daniel Kelleher, Berea, Ohio, assignor to Ira Saks, Cleveland, Ohio

Application June 11, 1945, Serial No. 598,867

3 Claims. (Cl. 192—111)

The present improvements, relating as indicated to friction clutches, have more particular regard to improvements in clutches such as are employed in automotive transmissions and the like wherein one of the elements is a spring of the so-called Belleville washer type. However, the invention may be utilized in connection with any clutch in which such an element is employed.

In all clutches of the friction type the opposed faces of the engaging parts are necessarily subject to wear, and furthermore, in reconditioning such clutches the faces in question may require to be reground, with the result that the thickness of such parts will vary. Accordingly, since it has not been found possible, or at least convenient, to provide with springs of the Belleville washer type take-up means of the kind used with ordinary compression springs, a serious problem has been encountered in maintaining the usefulness of clutches equipped with springs of such first-named type.

One principal object of the present invention is to provide a take-up device which may be readily incorporated in the several forms of clutch at present on the market wherein springs of the Belleville washer type are employed, so that such clutches may be compensated for variation in thickness of the engaging parts occasioned by wear or the refinishing of the faces of such parts. A further object is to provide such take-up means which will be of extremely simple construction and which may be applied to the clutch without any special tools or modification in any of the parts involved.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a central axial section through a friction clutch embodying my present improvements;

Fig. 2 is a broken elevational view of the main portion of such clutch as viewed from the right in Fig. 1;

Fig. 3 is a broken elevational view of the parts shown in Fig. 2 as viewed edge on;

Fig. 4 is a perspective view of one of the individual take-up elements utilized in the constructions illustrated in the preceding figures;

Fig. 5 is a view similar to that of Fig. 2 but showing a modified form of Belleville washer type of spring; and Fig. 6 is a radial section of such modified construction, the plane of the section being indicated by the line 6—6, Fig. 5.

Referring to Fig. 1, which most completely illustrates my present improved construction of clutch, the latter is enclosed as usual in a housing 1 into which there enters from one side a driving shaft 2 and from the other a driven shaft 3. Where the clutch is used in an automotive vehicle, such driving shaft will of course comprise one end of the engine crankshaft, while the driven shaft will be the adjacent end of the transmission shaft, the latter being held in alignment with the former by having its end reduced and fitted into a bearing 4 in the end of the driving shaft.

Fixedly attached to the end of such driving shaft is the usual flywheel 5, while splined on the adjacent end of the driven shaft, through the medium of a hub 6 and conventional cushioning device 7, is a plate 8. This plate carries annular frictional facings 9 respectively adapted to contact with the adjacent face of the flywheel and with the opposed face of a pressure plate 10 which is supported and adapted to be actuated by means of spring 12. The latter in the form illustrated in Figs. 1 to 3 inc., is of the Belleville washer type and comprises in effect a slightly dished annular plate formed with a series of radial corrugations 13 that extend from the central opening therein to its periphery. These corrugations, as shown in Fig. 1, gradually become deeper and broader as they approach the outer circumference of the plate, and the latter is generally positioned in relation to the previously described parts by means of a series of circumferentially spaced radially inwardly extending fingers 14 on a flange 15 attached to flywheel 5 outside the area of contact of the driven plate 8 therewith. Circumferentially spaced axial projections 10a on pressure plate 10, which are disposed to engage oppositely directed corrugations 13, further assist in thus retaining spring 12 in place.

The clutch operating means comprise a conventional lever 16, oscillatorily mounted at a point intermediate its ends on fulcrum 17 provided within casing 1. The inner end of said lever is forked to engage outwardly projecting pins 18 on a ring 19 of suitable bearing material that surrounds and is held against longitudinal movement on a flanged collar 20, which is in turn freely movable on the driven shaft 13 adjacent the spring 12. The central opening of the latter is provided with a close fitting cylindrical ring 21 that is formed with a radially projecting flange 22 adapted to bear against the adjacent side of collar 20 on driven shaft 3. This ring forms no part of the present invention and it is accordingly unnecessary to describe its detailed construction or manner of attachment to the spring.

While the plate 8 with the annular frictional facing 9 carried thereby upon the latter becoming worn can be readily replaced, the surfaces of the parts wherewith such facings contact when the clutch is in use are of course likewise subject to wear, and this may become a serious matter, particularly in the case of pressure plate 10 since any consequential reduction in its thickness will of course affect the degree of pressure which the spring 12 can exert thereon. The wear on the engaging face of such pressure plate moreover is frequently irregular, so that it becomes necessary to grind or otherwise refinish such face, thus further reducing the thickness of the part in question. To meet this situation, a special washer or shim 25 of the form best illustrated in Fig. 4 is provided, such shim being designed to fit over and engage with successive pairs of the circumferentially spaced axial projections 10a on pressure plate 10, as illustrated in Figs. 2 and 3. There will of course be as many shims required in a given clutch as there are pairs of such projections. These shims will be made in sets stamped up out of sheet metal of different gauges so that when interposed between said pressure plate and the corresponding outer portions of the radial corrugations 14 of the spring 12, they will in effect make up for any difference in the thickness of the pressure plate due to the wearing away or grinding off of its friction engaging face. The central portion of each such washer or shim is preferably stiffened by a stamped-up rig 26 and the lug-engaging portions 27, which project in opposite directions from such central portion are curved so as to hook over such lugs and thus assist in maintaining the take-up device in position. In order to retain said shim in position radially of the pressure plate 10 and the Belleville spring 12 between which it is interposed, said shim is provided with axially extending portions or flanges 35 and 36 which axially overlap the inner and outer faces of the projections 10a of the pressure plate 10. Thus, by reason of such portions 35 and 36, said shim is held against radial displacement between said pressure plate and said spring.

In the construction of clutch illustrated in Figs. 5 and 6 instead of employing a spring member 12 with radial corrugations to provide an operative connection between collar 20 and pressure plate 10, a modified form of Belleville washer 30 is utilized. This, as in the case of said spring 12, is slightly dished and is formed with a series of radial slots 31 which extend outwardly from the central opening in the disc to circular apertures 32 adjacent the periphery of the disc. In the assembled clutch, as best shown in Fig. 6, such disc periphery is disposed to bear on the circumferentially spaced axial projections 10a on pressure plate 10, being held against displacement by a series of spring clips 33 attached to the outer faces of certain of said lugs.

In this construction of clutch, just as in the one previously described, as the thickness of the pressure plate is reduced by the wearing away or refinishing of the friction disc-engaging face of said plate, the action of the spring washer 30 will obviously be reduced in its effectiveness, and in order to restore the normal action of the spring an annular washer 34 is interposed between the periphery of the latter and lugs 10a. As in the case of the shim or washer 25, such annular washer 34 will be stamped from sheet metal of various gauges so that proper take-up will be provided for any given reduction to which the thickness of the pressure plate has been subjected. In addition, said annular washer 34 will be formed with an axially extending portion or flange 37 which axially overlaps or embraces the peripheral edge of the spring washer 30, as best shown in Fig. 6, whereby to preclude radial displacement of said washer from its proper position interposed between the spring washer 30 and the pressure plate 10.

From the foregoing description it will be seen that by means of my improved wear-compensating device, clutches in which the friction plate is actuated by a resilient member of the Belleville washer type, whether of the corrugated form illustrated in Figs. 1 to 3 inc., or the plain dished form illustrated in Figs. 5 and 6, may be readily reconditioned for use even in the case of considerable wearing away of the friction disc-engaging face of said pressure plate. In other words, by replacing the friction disc, grinding such face of the friction plate, if necessary, and interposing a shim of selected thickness either in the form suitable for use with the corrugated form of Belleville washer resilient member or the plain form thereof, the clutch can be restored to its initial state of effectiveness, in other words, be just as good as new.

Other modes of applying the principle of my invention may be employed instead of the one explained, change being made as regards the mechanism herein desclosed, provided the means stated by any of the following claims or the equivalent of such stated means be employed.

I therefore particularly point out and distinctly claim as my invention:

1. In a clutch of the character described, the combination with a driving member, a driven member carrying a friction plate, a pressure plate cooperative with said friction plate, and a resilient member of the Belleville washer type adapted to actuate said plate, the latter being formed with a series of circumferentially spaced, axial projections wherewith said member peripherally engages; of a wear-compensating device comprising a series of circumferentially adjacent shims of selected thickness adapted to be interposed between said resilient member and such projections on said pressure plate, said shims being formed with axially extending portions overlapping opposite radially spaced faces of the respective projections to retain said shims in place relative to said pressure plate.

2. In a clutch of the character described, the combination with a driving member, a driven member carrying a friction plate, a pressure plate cooperative with said friction plate, and a resilient member of the Belleville washer type adapted to actuate said plate, the latter being formed with a series of circumferentially spaced, axial projections wherewith said member peripherally engages; of a wear-compensating device comprising a series of circumferentially adjacent shims of selected thickness adapted to be interposed between said resilient member and such projections on said pressure plate, said shims being curved to hook over the respective projections and thereby be retained in place, and being provided with axially extending portions overlapping the respective projections for retaining said shims radially of said pressure plate.

3. In a clutch of the character described, the combination with a driving member, a driven member carrying a friction plate, a pressure plate cooperative with said friction plate, and a resilient member of the Belleville washer type adapted to actuate said plate, the latter being formed with a series of circumferentially spaced, axial projections wherewith said member peripherally engages; of a wear-compensating device comprising a series of circumferentially adjacent shims of selected thickness adapted to be interposed between said resilient member and such projections on said pressure plate, said shims each being curved to hook over a pair of adjacent projections and thereby be retained in place, and being provided with axially extending portions overlapping such pair of adjacent projections for retaining said shims radially of said pressure plate.

DANIEL KELLEHER.

REFERENCES CITED

The following references are of record in the file of this patent:

UNITED STATES PATENTS

| Number | Name | Date |
| --- | --- | --- |
| 1,470,268 | Lauth | Oct. 9, 1923 |
| 2,100,464 | Almen et al. | Nov. 30, 1937 |
| 2,195,664 | Wolfram | Apr. 2, 1940 |
| 2,229,910 | Adamson et al. | Jan. 28, 1941 |
| 2,356,310 | Gass | Aug. 22, 1944 |